(12) United States Patent
Koumans et al.

(10) Patent No.: US 10,948,665 B2
(45) Date of Patent: Mar. 16, 2021

(54) OPTICAL COUPLING ASSEMBLY

(71) Applicant: Molex, LLC, Lisle, IL (US)

(72) Inventors: Roger Koumans, Irvine, CA (US); Drew Guckenberger, Carlsbad, CA (US); Mark Harrison, Carlsbad, CA (US); Russell K. Stiles, Downers Grove, IL (US)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 16/081,717

(22) PCT Filed: Mar. 3, 2017

(86) PCT No.: PCT/US2017/020578
§ 371 (c)(1),
(2) Date: Aug. 31, 2018

(87) PCT Pub. No.: WO2017/152003
PCT Pub. Date: Sep. 8, 2017

(65) Prior Publication Data
US 2019/0079253 A1   Mar. 14, 2019

Related U.S. Application Data

(60) Provisional application No. 62/303,933, filed on Mar. 4, 2016, provisional application No. 62/419,752, filed on Nov. 9, 2016.

(51) Int. Cl.
*G02B 6/12* (2006.01)
*G02B 6/42* (2006.01)
(Continued)

(52) U.S. Cl.
CPC .......... *G02B 6/4214* (2013.01); *G02B 6/262* (2013.01); *G02B 6/3652* (2013.01); *G02B 6/425* (2013.01); *G02B 6/4225* (2013.01); *G02B 6/4292* (2013.01)

(58) Field of Classification Search
CPC ....... H01L 2924/00014; H01L 2924/00; H01L 2224/16225; G02B 6/12; G02B 6/4214;
(Continued)

(56) References Cited

U.S. PATENT DOCUMENTS 6,075,913 A   6/2000 Cohen et al.
10,222,563 B2 * 3/2019 Haase .................. G02B 6/4204
(Continued)

FOREIGN PATENT DOCUMENTS

CN   1191980 A    9/1998
JP   4239722 B2   3/2009
(Continued)

OTHER PUBLICATIONS

Extended European Search Report and Opinion received for EP application No. 17760869.2, dated Sep. 16, 2019, 8 pages.

*Primary Examiner* — Jennifer Doan

(57) ABSTRACT

An optical system includes a base, a plurality of optical fibers, and a plurality of optical components. The base has a fiber retention and alignment section and an optical coupling section. The fiber retention and alignment section have a plurality of alignment members, where each alignment member is configured to receive an optical fiber therein. The optical coupling section has an optical coupling block and includes a plurality of optical coupling elements, with each optical coupling element having an ellipsoidal reflecting surface defining a first focal point and a second focal point. The first focal surface is generally aligned with the first focal point. The second focal surface is generally aligned with the second focal point. Each optical fiber is positioned within one of the alignment members and adjacent one of the first focal surfaces. Each optical component is positioned adjacent one of the second focal surfaces.

18 Claims, 12 Drawing Sheets

(51) Int. Cl.
*G02B 6/36* (2006.01)
*G02B 6/26* (2006.01)

(58) Field of Classification Search
CPC .... G02B 6/3652; G02B 6/262; G02B 6/4225; G02B 6/425; G02B 6/4292
See application file for complete search history.

(56) References Cited

U.S. PATENT DOCUMENTS

| | | |
|---|---|---|
| 2003/0091301 A1 | 5/2003 | Lee et al. |
| 2010/0158450 A1 | 6/2010 | Koreeda et al. |
| 2013/0094807 A1 | 4/2013 | Shao et al. |
| 2013/0259423 A1 | 10/2013 | Charbonneau-Lefort |
| 2013/0294732 A1* | 11/2013 | Li .................. G02B 6/4219 385/83 |
| 2014/0178011 A1 | 6/2014 | Chang et al. |
| 2014/0199025 A1 | 7/2014 | Shani et al. |
| 2014/0205235 A1* | 7/2014 | Benjamin ......... G02B 6/4292 385/33 |
| 2016/0231518 A1 | 8/2016 | Stiles et al. |

FOREIGN PATENT DOCUMENTS

| | | |
|---|---|---|
| TW | I502238 B | 1/2015 |
| WO | 2015/094811 A1 | 6/2015 |
| WO | 2015/176050 A1 | 11/2015 |

\* cited by examiner

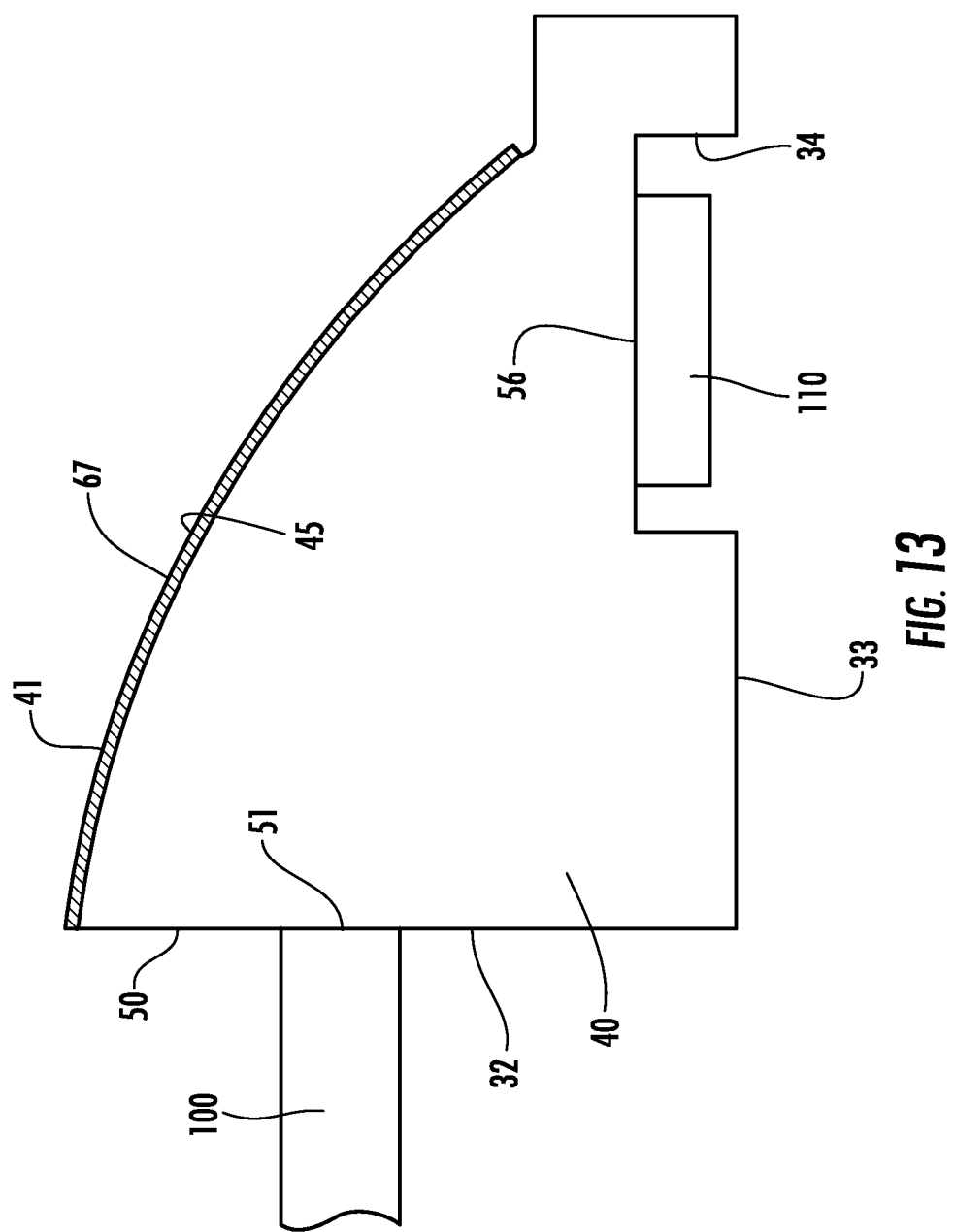

OPTICAL COUPLING ASSEMBLY

RELATED APPLICATIONS

This patent application claims priority to both U.S. Provisional Patent Application 62/303,933, filed on Mar. 4, 2016 and entitled "OPTICAL COUPLING ASSEMBLY," and U.S. Provisional Patent Application 62/419,752, filed on Nov. 9, 2016 and entitled "OPTICAL COUPLING ASSEMBLY," the entire contents of which are incorporated by reference in their entirety.

TECHNICAL FIELD

The present disclosure relates generally to optical assemblies and, more particularly, to an optical coupling element and assembly for use in interconnecting optical components.

BACKGROUND

Optical modules are commonly configured to transmit multi-mode signals for use in short reach applications such as with servers, data storage, and data management. Optical modules may also be configured to transmit single mode fiber signals for use in medium reach applications such as with remote antennas and data centers. Optical modules typically include a plurality of discrete components such as carrier structures, fiber holders, focusing optics, and turning mirrors or prisms. Optical components are often made from optically transparent materials like glass and polymers. The number of discrete components along each optical path may reduce performance as each optical interface increases the likelihood of reflections and misalignment. In addition, each component may require its own alignment step, resulting in a plurality of time consuming alignment steps during assembly and an increase in tolerance stackup.

In addition, a significant issue when using optical components made of polymer is the performance of the optical system over temperature. For example, optic components made from polymers have fundamental properties inherent to the material, such as, changes in refractive index with temperature (dn/dT) and coefficients of thermal expansion (CTE), that are typically ten times larger than glass or electronic substrates and glass filled polymers to which they are attached. These fundamental properties limit or complicate the use of polymer optical components in many optical applications.

In some applications, the large dn/dT and CTE properties may generate a change in focused light position that results in a degradation of performance of the optical connection over temperature. This degradation of performance limits and sometimes prevents the use of polymer optic components in many fiber optic applications. In some instances, single mode fiber based applications may be especially susceptible to degradation of performance due to the effects of changes in temperature.

Based upon the complexity of the assembly process of optical systems and the potential for diminished or reduced performance, systems having reduced complexity and improved manufacturability are desirable.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, an optical system includes a base having a fiber retention and alignment section and an optical coupling section. The fiber retention and alignment section has a plurality of alignment members and each alignment member is configured to receive an optical fiber therein. The optical coupling section has an optical coupling block and includes a plurality of optical coupling elements. Each optical coupling element has an ellipsoidal reflecting surface defining a first focal point and a second focal point. A first focal surface is generally aligned with the first focal point and a second focal surface is generally aligned with the second focal point with the first focal surface and the second focal surface spaced apart and at an angle to each other. An optical path extends through each optical coupling element from the first focal point to the reflecting surface and to the second focal point and each alignment member is aligned with the first focal point of one of the optical coupling elements. An optical fiber is positioned within one of the alignment members and adjacent one of the first focal surfaces and an optical component is optically aligned with each optical fiber and positioned adjacent one of the second focal surfaces.

In another aspect, an optical assembly includes a one-piece, unitarily formed base having a fiber retention and alignment section and an optical coupling section. The fiber retention and alignment section has a plurality of alignment members, each being configured to receive an optical fiber therein. The optical coupling section has an optical coupling block and includes a plurality of optical coupling elements. Each optical coupling element has an ellipsoidal reflecting surface defining a first focal point and a second focal point. A first focal surface is generally aligned with the first focal point and a second focal surface is generally aligned with the second focal point with the first focal surface and the second focal surface being spaced apart and at an angle to each other. An optical path extends through each optical coupling element from the first focal point to the reflecting surface and to the second focal point and each alignment member is aligned with the first focal point of one of the optical coupling elements.

BRIEF DESCRIPTION OF THE DRAWINGS

FIG. 13 is a schematic illustration of an alternate embodiment of an optical coupling element.

DETAILED DESCRIPTION

Figure 1:
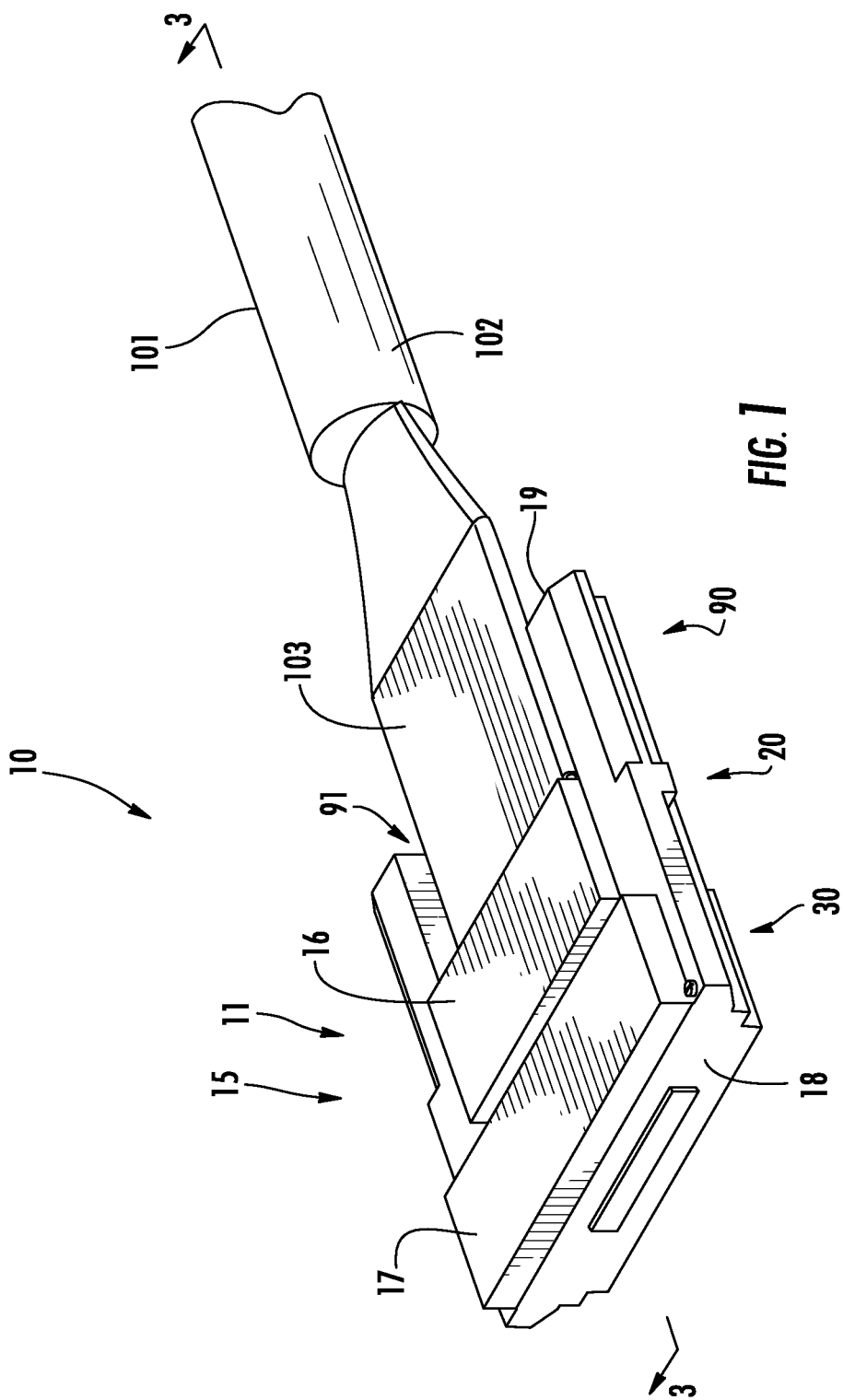
FIG. 1 is a perspective view of an optical system.
Figure 2:
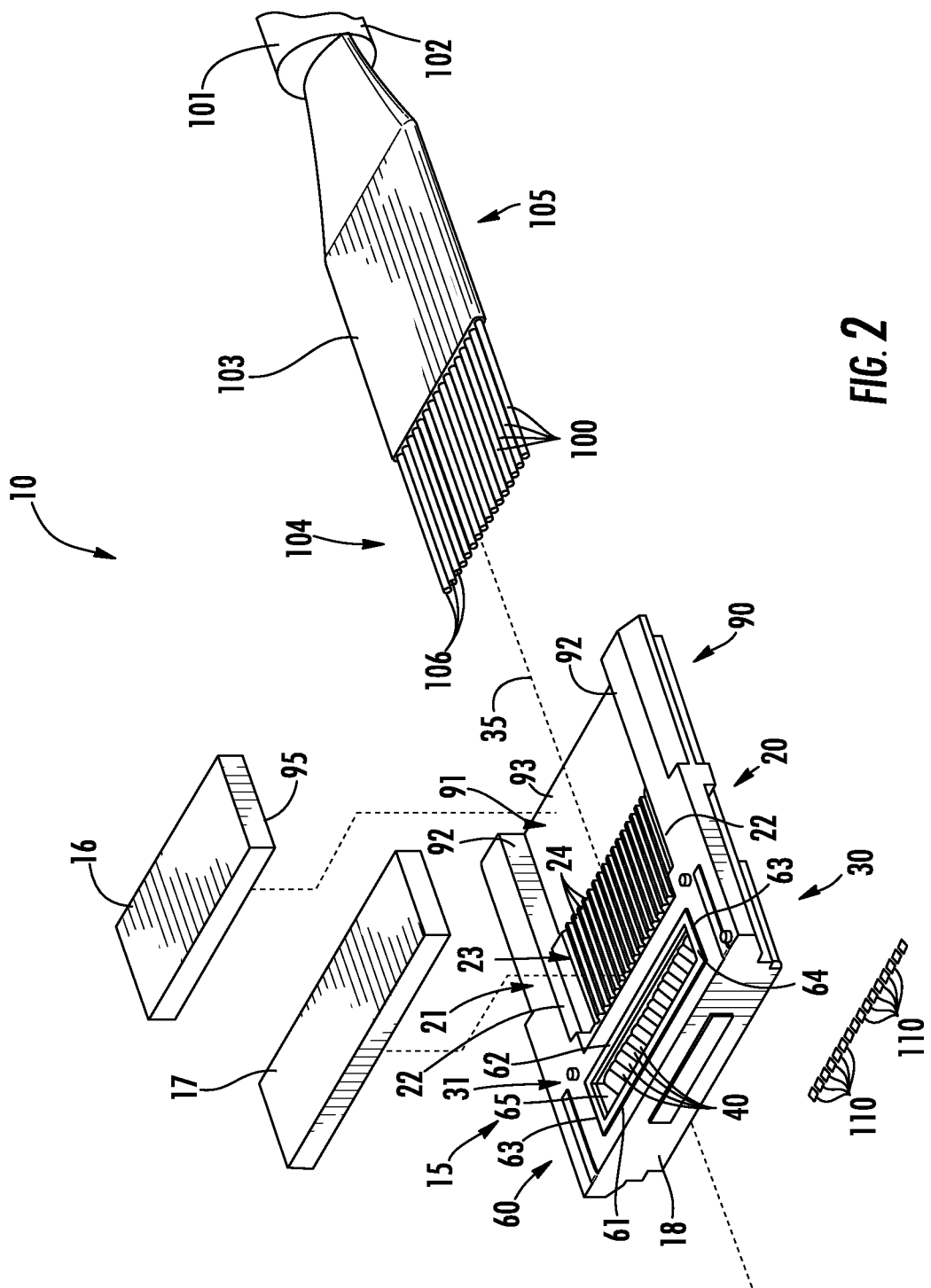
FIG. 2 is an exploded perspective view of the optical system of FIG. 1.
Figure 3:
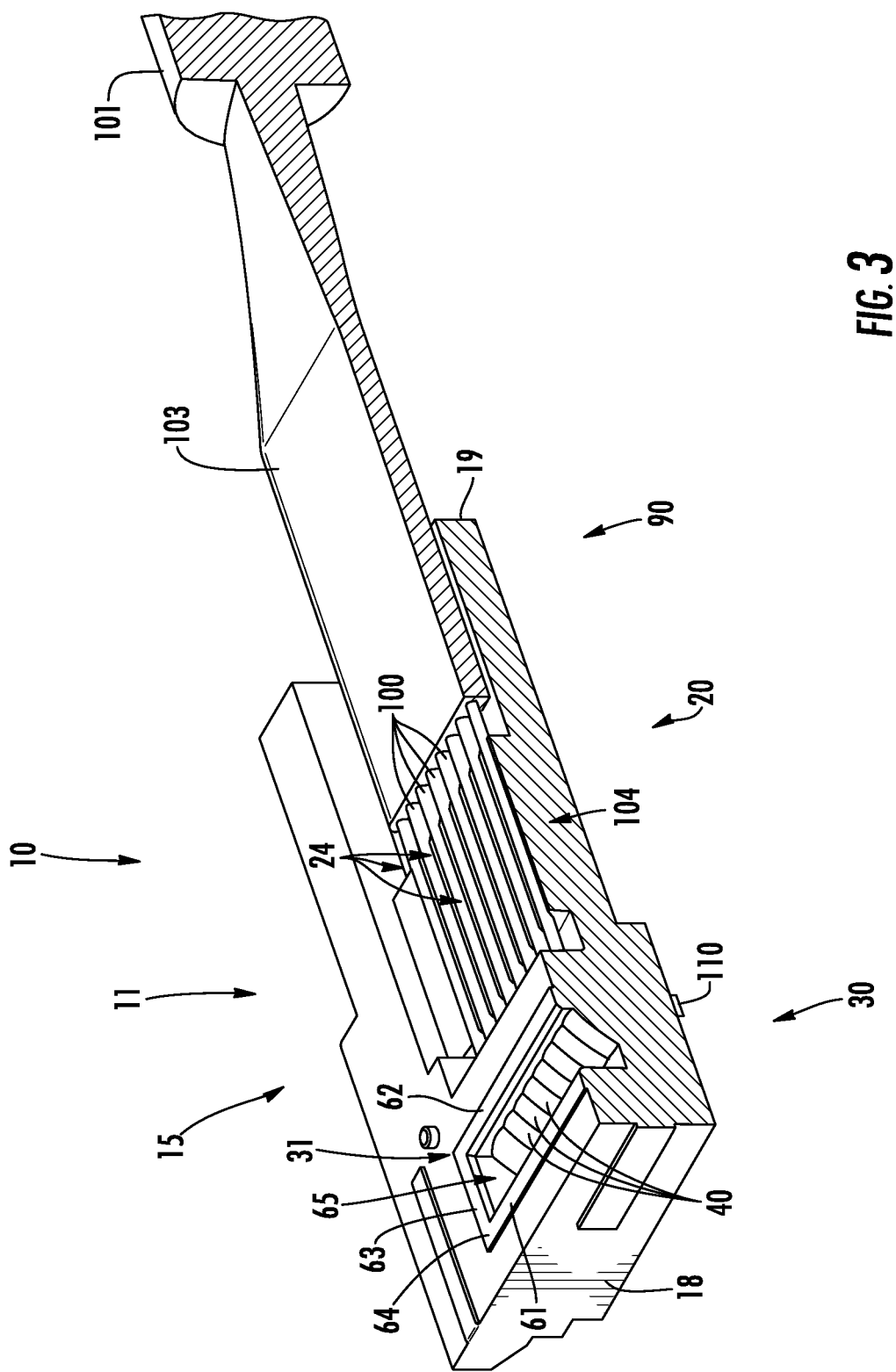
FIG. 3 is a sectional view taken generally along line 3-3 of FIG. 1.

Referring to FIGS. 1-2, an optical system 10 includes an optical assembly 11 such as a transceiver optically coupled or interconnected to a plurality of first optical components in the form of glass, silica, or plastic optical fibers 100 (FIG. 2) of a cable 101 and a plurality of second optical components in the form of opto-electronic components 110. The cable 101 may include any number and any type of optical fibers 100. For example, as depicted, the cable 101 is generally round and includes a plurality of optical fibers 100 in the form of a ribbon that extends from the sheathing 102 of the cable. Materials (not shown) that surround the optical fibers 100 such as buffer 103 may be removed from end portions 104 to assist in precisely positioning the optical fibers within the optical assembly 11. In an alternate embodiment that is not depicted, the cable 101 may include a plurality of loose optical fibers 100. The optical fibers 100 may have any configuration or be any type such as single-mode or multi-mode.

The first and second optical components may have any configuration or be any type of component such as active components (e.g., opto-electronic) and/or passive components (e.g., optical fibers). The configuration of the optical components may be based upon the direction in which the light is to be transmitted within the structure of the assembly. In one embodiment, a first optical component may be any optical source such as a semi-conductor emitter or transmitter or an optical fiber 100 through which an optical signal is transmitted. In such embodiment, the second optical component may be any optical target such as a semi-conductor detector or receiver or an optical fiber 100 into which an optical signal is directed. As depicted, the first optical component is an optical fiber 100 and the second optical component is an opto-electronic receiver. For an embodiment in which it is desired for light to travel in an opposite direction, an opto-electronic transmitter may be substituted for the opto-electronic receiver.

The optical assembly 1 includes a base 15, a fiber retention cover 16, a reflector cover 17, and a plurality of the optical components such as optical fibers 100 and opto-electronic components 110. The base 15 includes a fiber retention and alignment section 20, an optical coupling section 30 extending from the fiber retention and alignment section to a first or opto-electronic edge 18 of the base, and a fiber support section 90 extending from the fiber retention and alignment section to a second or fiber edge 19 of the base, opposite the first edge.

The fiber retention and alignment section 20 is operative to accurately position and secure the plurality of optical fibers 100 to the optical assembly 11 at the desired spacing. The fiber retention and alignment section 20 includes a recess 21 that extends between spaced apart lateral sidewalls 22. A lower surface 23 of the recess 21 may include a plurality of parallel alignment members such as V-grooves 24 that extend along a length of the upper surface in a front to rear direction. The V-grooves 24 may be dimensioned to receive and accurately position therein the stripped free end portions 104 of the plurality of optical fibers 100. In other words, the buffer 103 and any other materials that surround the optical fibers 100 have been removed from the portions of the optical fibers that are secured within the V-grooves 24. It is not necessary for the V-grooves 24 to extend the entire length of the fiber retention and alignment section 20. The optical fibers 100 may be secured within the V-grooves 24 in any desired manner such as with an adhesive (e.g., epoxy). The alignment members may have other configurations besides V-shaped grooves including stepped-grooves or through holes.

Figure 6:
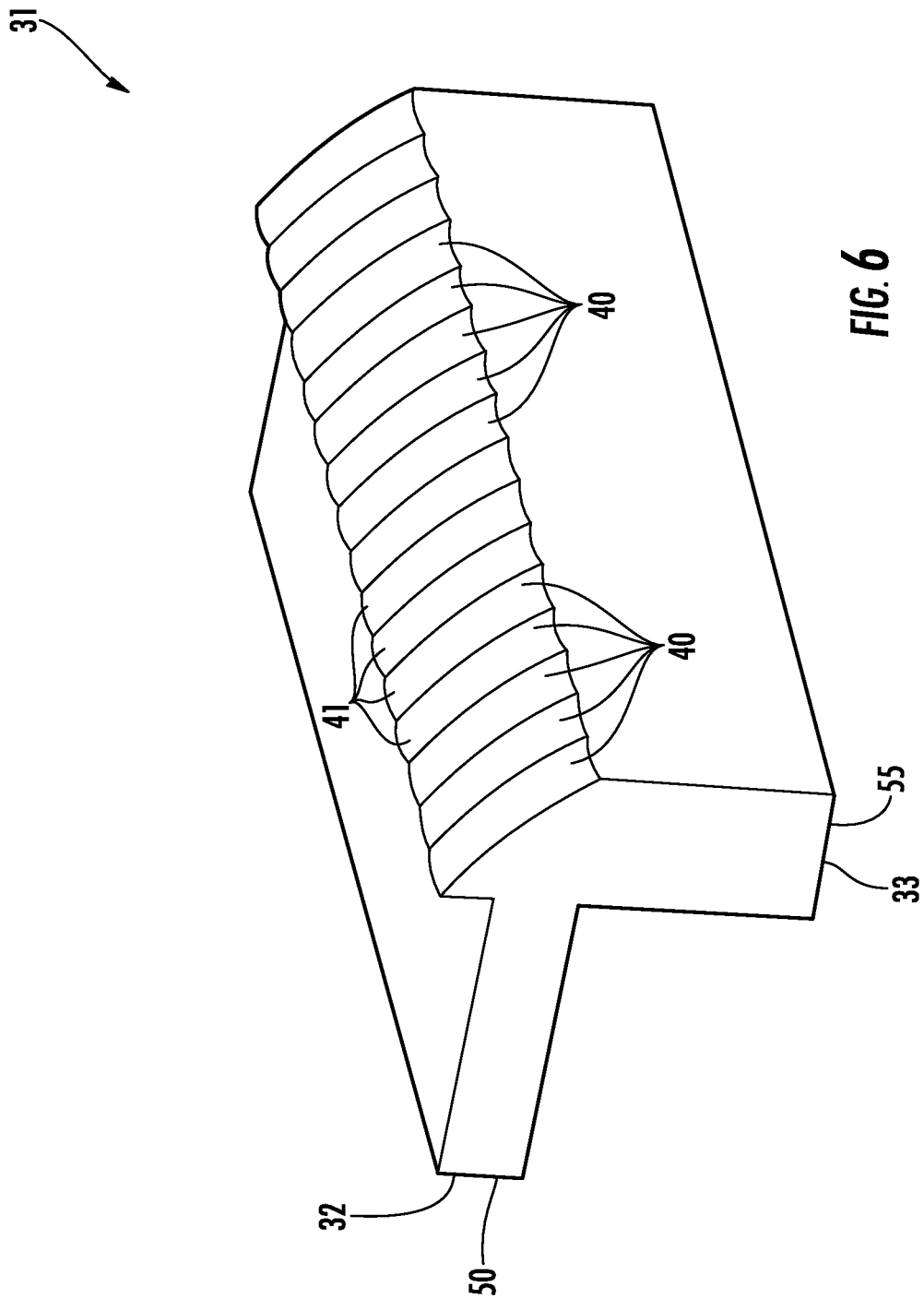
FIG. 6 is a schematic illustration of an optical coupling member within the optical system of FIG. 1.

The optical coupling section 30 includes an optical coupling block or member 31 therein with a plurality of laterally spaced apart optical coupling elements 40. The optical coupling block 31 includes a first optical face 32 (FIG. 4) located adjacent the fiber retention and alignment section 20 and a second optical face 33 located at an angle to the first optical face 32. Although each coupling element 40 is aligned with one of the V-grooves 24 and one of the optical components, the optical coupling block 31 is depicted schematically in FIG. 6 separate from the optical coupling section 30 and coupled to only one optical fiber 100 and one opto-electronic component 110 for clarity in FIG. 7. Each coupling element 40 directs optical signals in the form of light in either direction between an optical fiber 100 positioned in a V-groove 24 and the opto-electronic component 110 as described in further detail below.

Referring to FIGS. 7-10, an example of a coupling element 40 is depicted. Coupling element 40 includes a first focal surface 50 along the first optical face 32 of the coupling member 31 and a second focal surface 55 along the second optical face 33 of the coupling member. The first focal surface 50 is spaced from and at an angle to the second focal surface 55. The angle between the first focal surface 50 and the second focal surface 55 may be any desired angle provided that the other characteristics of the optical element 40 as described below are met. In some applications, the angle between the first focal surface 50 and the second focal surface 55 may be between approximately 70 and 110 degrees. In other applications, the angle may be approximately 90 degrees.

A reflecting surface 41 is spaced from and opposes each of the first focal surface 50 and the second focal surface 55. Reflecting surface 41 may have an ellipsoidal shape or surface to create or define a pair of optical foci or focal points 51, 56. An ellipse defining a portion of the reflecting surface 41 is depicted in dashed line 58 for clarity. First focal point 51 may fall on or be aligned with first focal surface 50 and second focal point 56 may fall on or be aligned with the second focal surface 55. By aligning the first focal point 51 in three dimensions (x, y, and z) with a first optical component (depicted as an optical fiber 100) and second focal point 56 in three dimensions with a second optical component (depicted as an opto-electronic component 110), losses within the optical coupling between the first optical component and the second optical component may be minimized.

It should be noted that in some instances, it may be desirable to only generally align the focal surfaces with the respective foci. For example, this may occur when it is desirable for the beam of light being transmitted to be focused at a specified diameter rather than a specified point or in instances in which exact alignment is not required for system performance. In such case, the light enters and exits coupling element 40 at a focal location along a plane rather than at a point. For clarity, as used herein, such a larger focal location shall be still considered a focal point.

Figure 7:
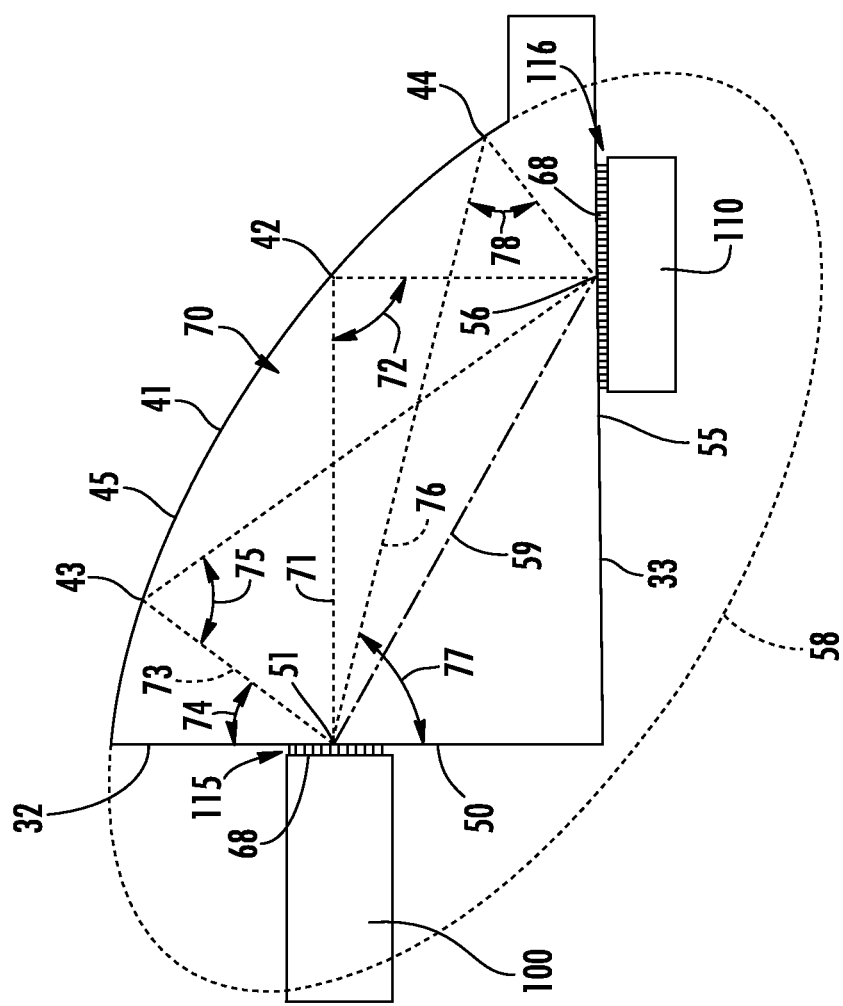
FIG. 7 is a schematic illustration of an optical coupling element of the optical coupling member of FIG. 6.

As depicted in FIG. 7, the major axis 59 of ellipse 58 (i.e., a line through the foci) is at an angle to both the first focal surface 50 and the second focal surface 55. The angle of the major axis 59 relative to the focal surfaces coincides with the angle of the reflecting surface relative to the focal surfaces.

First focal surface 50 is configured as a source location aligned with first optical component and second focal surface 55 is configured as a target location aligned with the second optical component. As such, optical signals in the form of a beam of light may enter the first focal surface 50 at an angle generally perpendicular to the first focal surface, reflect off the reflecting surface 41, and exit from the second focal surface 55 at an angle generally perpendicular to the second focal surface. It should be noted that the direction of light transmission and/or the first optical component and the second optical component may be reversed with the coupling element 40 operating with equal effectiveness.

Figure 11:
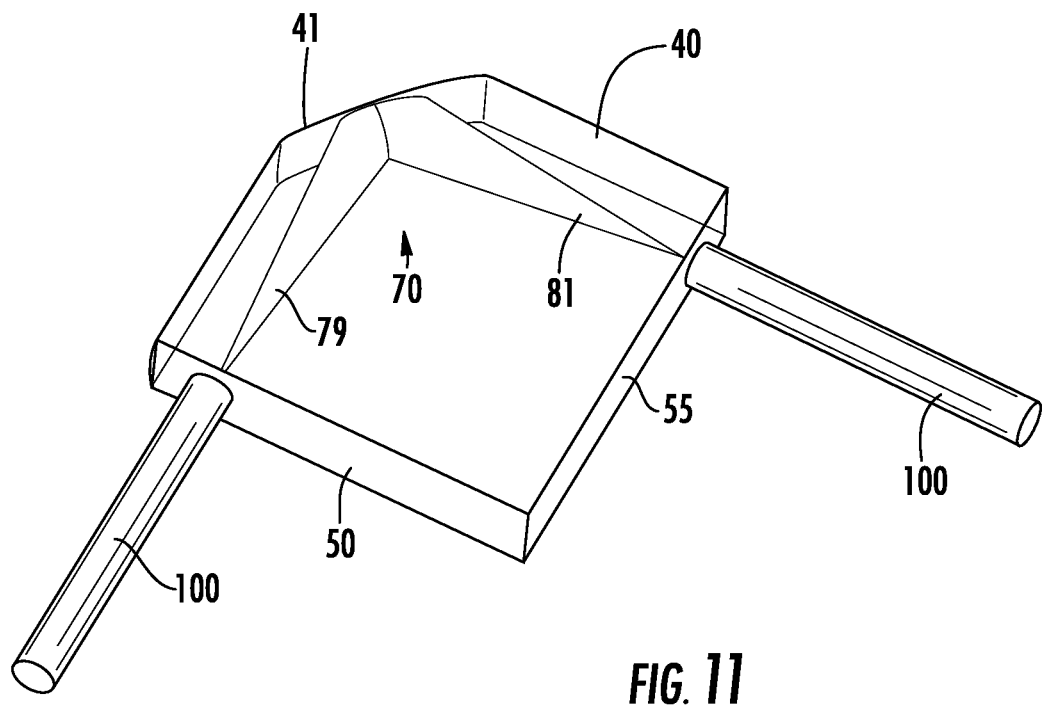
FIG. 11 is a perspective view of an alternate embodiment of an optical coupling element with optical fibers coupled to the optical faces.
Figure 12:
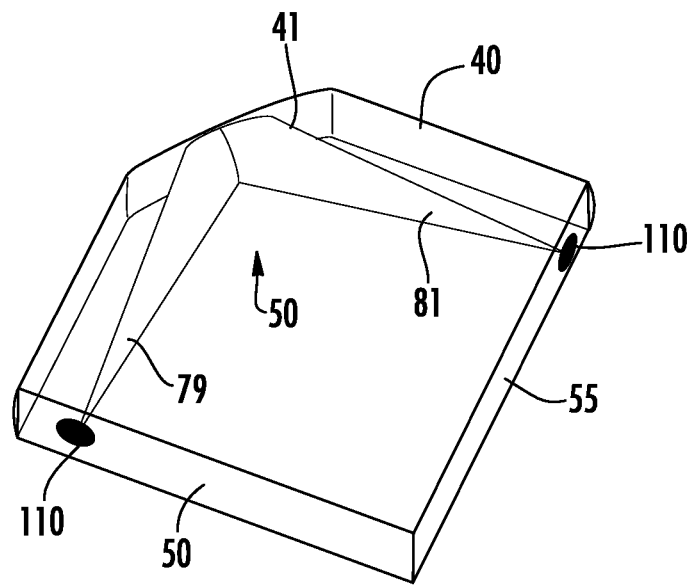
FIG. 12 is a perspective view of another alternate embodiment of an optical coupling element with an transmitter and a receiver coupled to the optical faces.

In other words, the coupling element 40 operates in an equally effective manner regardless of whether light is being transmitted from the first focal surface 50 to the second focal surface 55 or if light is being transmitted from the second focal surface to the first focal surface. As an example, the first optical component is depicted in FIG. 7 as an optical fiber 100 and second optical component as an opto-electronic component 110. In FIG. 11, both the first optical component and the second optical component are depicted as optical fibers 100. In FIG. 12, both the first optical component and the second optical component are depicted as opto-electronic components 110.

By positioning optical element 40 so that the reflecting surface 41 is in contact with air, the difference in the indices of refraction between the optical element and air causes light to reflect efficiently off the reflecting surface. That is, provided that the light engages the reflecting surface at an angle greater than the critical angle, the ellipsoidal shaped reflecting surface 41 operates as a total internal reflecting mirror that efficiently reflects light that enters the optical element 40 at the first focal point 51 and focuses the light at the second focal point 56. As a result, light entering the optical element 40 from the first optical component will efficiently reflect off reflecting surface 41 and direct the light into second optical component.

As depicted in FIGS. 7-12, an optical signal transmitted through coupling element 40 may be depicted as a beam or a bundle of rays 70. A first component of the beam is depicted at 71 entering optical element 40 at a first angle generally perpendicular to first focal surface 50 at a source location corresponding to the first focal point 51 and reflects off of reflecting surface 41 at location 42 at a first reflecting angle 72 so that the light is reflected to second focal point 56. In addition, a second component of the beam that represents one outer vertical boundary of the beam is depicted at 73 entering optical element 40 at a second entry angle 74 relative to surface 50 at a source location corresponding to the first focal point 51 and reflects off of reflecting surface 41 at location 43 at a second reflecting angle 75 so that the light is reflected to second focal point 56. Still further, a third component of the beam that represents an opposite outer vertical boundary of the beam is depicted at 76 entering optical element 40 at a third entry angle 77 relative to surface 50 at a source location corresponding to the first focal point 51 and reflects off of reflecting surface 41 at location 44 at a third reflecting angle 78 so that the light is reflected to second focal point 56. Thus, as the light from first optical component expands as it enters optical element 40, all of the light will be reflected to the second focal point 56.

Referring to FIGS. 8-9 and 11-12, it will be understood that the beam of light 70 will expand in three dimensions to form a relative conical shape and the ellipsoidal shape of the reflecting surface will reflect the light to the second focal point 56. For example, light enters the coupling element 40 at first focal surface 50 as a relatively small collimated beam of light 79. The beam expands in three dimensions as it travels through coupling element 40 until it reaches reflecting surface 41. The beam of light will contact the reflecting surface 41 in a generally elliptical shape as depicted at 80 (FIG. 8) and reflect off the reflecting surface.

Figure 8:
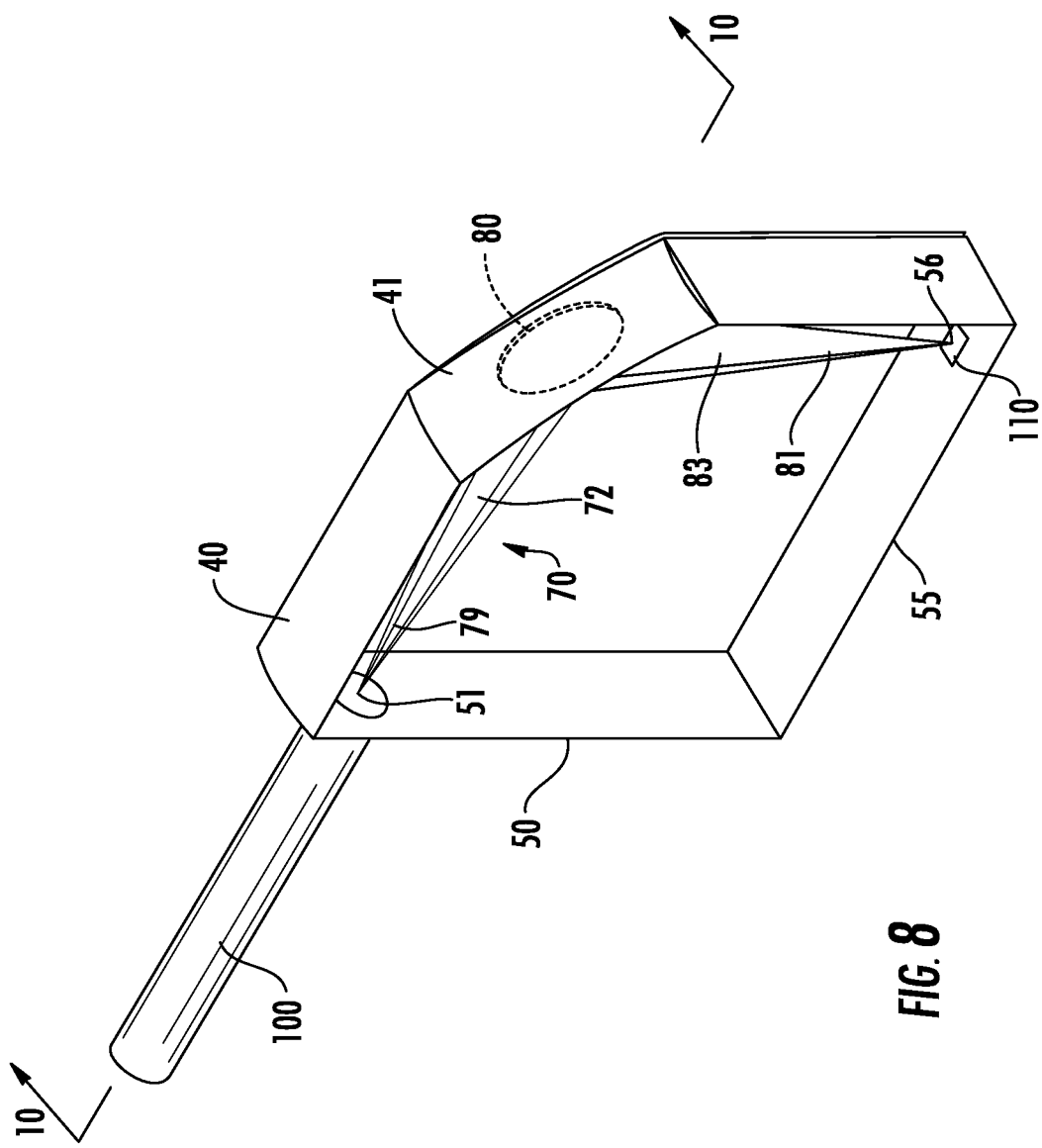
FIG. 8 is a perspective view of another optical coupling element according to the disclosure.
Figure 9:
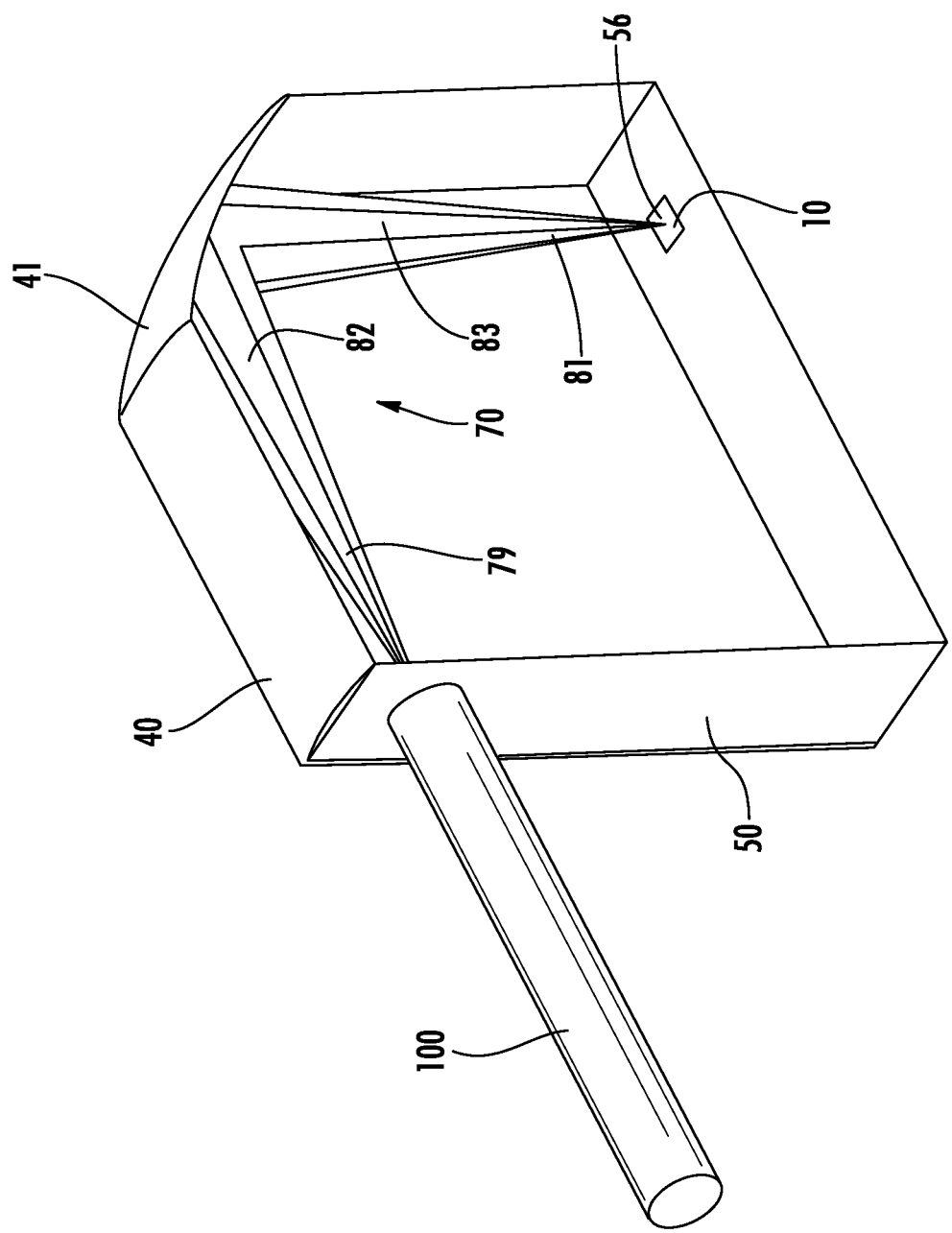
FIG. 9 is a perspective view similar to FIG. 8 but taken from a different perspective.
Figure 10:
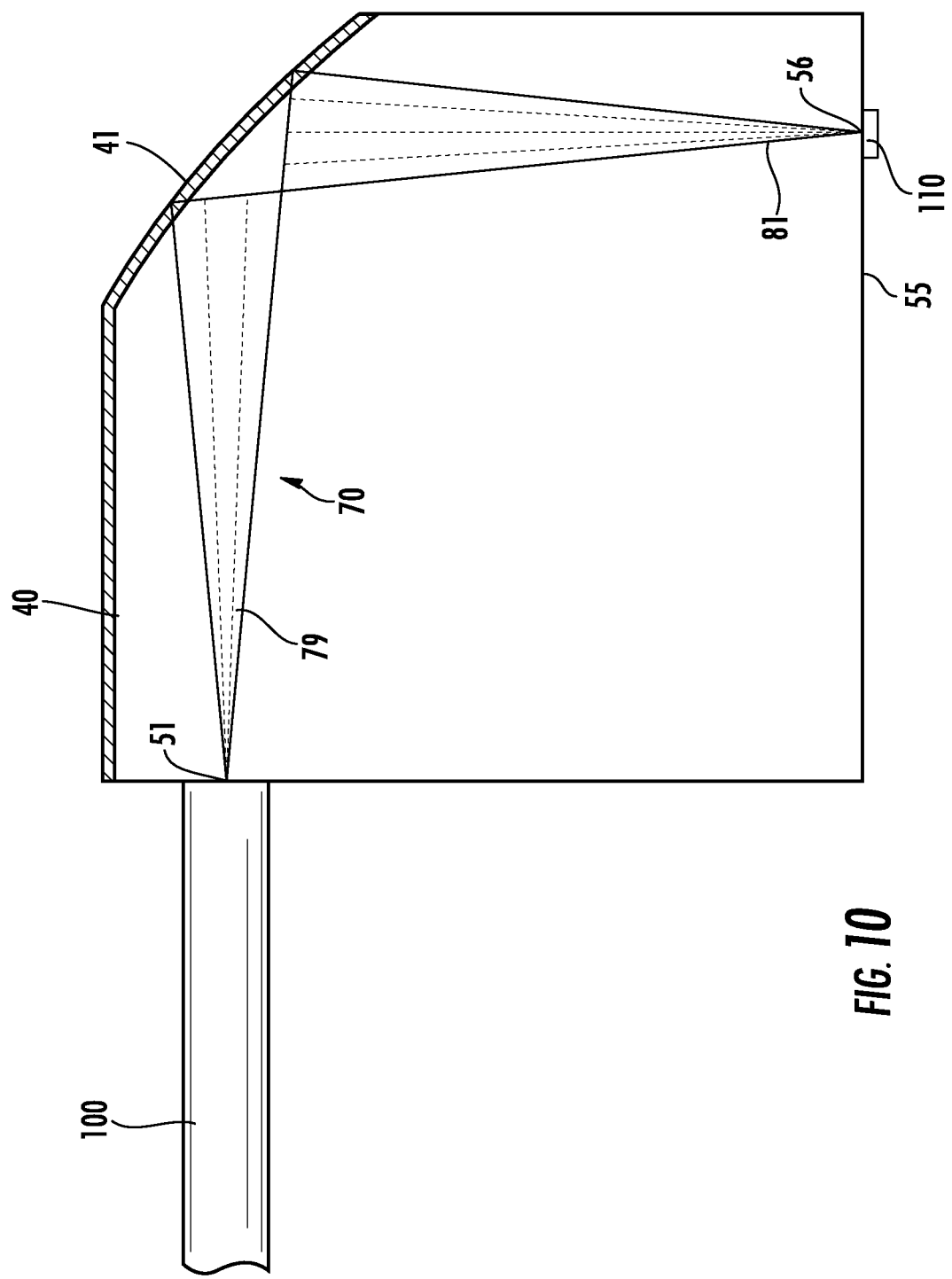
FIG. 10 is a sectional view of the optical coupling element of FIG. 8 taken generally along line 10-10.

The beam of light will taper or focus as depicted at 81 until it reaches the second focal point 56. In a manner similar to the outer vertical boundaries of the beam that are depicted at 73 and 76 (as depicted in FIG. 7), the lateral or horizontal expansion of the beam of light will also be redirected by the ellipsoidal reflecting surface 41 to the second focal point 56. One lateral outer boundary of the beam of light 70 as it expands is depicted in FIGS. 8-9 at 82 and a lateral outer boundary as the beam of light contracts or is focused is depicted at 83.

Although depicted with a symmetrical reflecting surface 41 along both x and y axes in FIGS. 8-12, in some instances, the ellipsoidal shape of the reflecting surface may not be symmetrical. Since the reflecting surface 41, as depicted, is symmetrical along both the x and y axes, the reflecting surface will have identical optical powers. In such case, a reflected beam will be optically modified (e.g., expand) at equal rates and in a consistent manner. In other words, the focal points for the reflector along the z-axis will be the same along both the x and y axes.

However, if the reflecting surface 41 is formed so as to be asymmetrical with respect to the x and y axes (but symmetrical about each of the x and y axes), the reflecting surface will have different optical powers along the x and y axes. As a result, a reflected beam will have different focal points relative to the z axis. In some instances, this may be useful such as to modify the optical beam to compensate for a source that generates an asymmetrical optical signal. For example, if the optical assembly 11 includes an optical element 40 for optically connecting a laser that generates a 2×5 µm mode to a single mode optical fiber 100 with a core of 10 µm, the reflecting surface 41 may be configured to reflect with an optical power of 5 along one axis and 2 along the other axis to modify the mode to achieve a uniform input to the optical fiber core.

Still further, in some instances, the reflecting surface may be asymmetrical with respect to the x and y axes and also asymmetrical about each of the x and y axes. For example, the portion of the reflecting surface 41 on each side of the x and/or y axes may still be ellipsoidal but have different optical powers. Such asymmetry may allow further modification of an input mode as desired. As used herein, such asymmetrical reflecting surface may still be considered ellipsoidal.

Under ideal operating conditions, reflecting surface 41 operates as a total internal reflecting mirror due to the shape of the surface and the difference in the indices of refraction between the optical coupling element 40 (optical grade polymer) and the atmosphere (air) surrounding the reflecting surface. However, if a contaminant or foreign material (e.g., water, dirt, dust, adhesive) is in contact with the outer surface 45 of the reflecting surface 41, such undesired material may change the difference in the indices of refraction between the optical coupling element 40 and the air at the location of the contaminant and thus change the optical characteristics of the reflecting surface at the contaminant.

In order to reduce the risk of such a change in the reflecting characteristics of the reflecting surface 41, and a corresponding change in the performance of optical coupling element 40, it may be desirable to add or apply a reflective coating or plating 67 (FIG. 13) to the outer surface 45 of the optical coupling element 40 along the reflecting surface 41. The coating 67 provides additional reflectivity in case any contaminants or foreign materials come into contact with or become affixed to the outer surface of the reflecting surface. The reflective coating 67 may be any highly reflective material such as gold, silver, or any other desired material. Coating 67 may be applied to the outer surface 45 in any desired manner. Although depicted with the coating 67 extending along the entire reflecting surface 41, the coating may be selectively applied so that it is only applied in the portion of the reflecting surface at which most of the beam of light will reflect.

Referring back to FIGS. 1-5, a support member or frame 60 generally extends around and supports a portion of the optical coupling block 31 and includes a first lateral or transverse rail 61 that extends generally perpendicularly to the longitudinal axis 35 of base 15 (and parallel to the V-grooves 24 and the axes of optical fibers 100) and along first edge 18 of base 15. A second lateral or transverse rail 62 is generally parallel to the first lateral rail 61 and is positioned adjacent the fiber retention and alignment section 20. A pair of spaced apart longitudinal rails 63 are generally parallel to the longitudinal axis 35 of base 15 and interconnect the first lateral rail 61 with the second lateral rail 62 along opposite sides of the base. The first lateral rail 61, the second lateral rail 62, and the longitudinal rails 63 define a generally planar surface 64. A recess 65 extends through the generally planar surface 64 and a portion of the recess defines the reflecting surface 41 of the optical coupling elements 40.

Fiber support section 90 is operative to support and secure portions 105 of the optical fibers 100 between the fiber retention and alignment section 20 and the cable sheathing 102. The fiber support section 90 includes a recess 91 that extends between spaced apart lateral sidewalls 92. The lower surface 93 of the recess 91 may be lower than the lower surface 23 of recess 21 to accommodate the greater thickness of the optical fibers 100 together with buffer 103. If the optical fibers 100 and cable 101 are configured in a different manner, the recess 91 may be similarly re-configured.

Optical coupling block 31 may be formed as a one-piece, unitarily formed member or component of an optical grade polymer or resin that is capable of being injection molded, formed as part of an additive process (e.g., 3-D printed) or otherwise formed, such as polycarbonate, polyetherimide, cyclic olefin, or polysulfone. In other embodiments, the optical coupling block 31 may be formed of any material through which light or signals at the relevant wavelengths may be transmitted (i.e., are transparent). In other words, in some applications, it may be possible to form optical coupling block 31 of glass, silicon or other materials depending on the desired wavelengths to be transmitted and available manufacturing processes.

In one embodiment, the entire base 15 may be formed as a one-piece, unitarily formed member or component including each of the fiber retention and alignment section 20, the optical coupling section 30, and the support section 90. In another embodiment, the fiber retention and alignment section 20 and the optical coupling section 30 may be formed as a one-piece, unitarily formed member or component. In other embodiments, any or all of the individual sections may be formed separately and, in some instances, may also be formed of other materials, if desired. Forming elements (such as the optical coupling block 31) or sections (such as retention and alignment section 20 and the optical coupling section 30) as a one-piece, unitarily formed member or component may simplify the assembly process by maintaining desired alignment and tolerances without the need to assemble the elements or sections. The base 15, and the sections and components thereof, may be formed of any desired material.

Fiber retention cover 16 is generally rectangular and is dimensioned to be at least partially received within recess 21 of the fiber retention and alignment section 20 between the sidewalls 22 and above the V-grooves 24. The fiber retention cover 16 may be secured in any desired manner. In one example, an adhesive such as epoxy is used to both secure the optical fibers 100 within the V-grooves 24 and also secure the fiber retention cover 16 within the recess 21. When the fiber retention cover 16 is inserted into the recess 21, the lower surface 95 (FIG. 4) of the cover engages the top surface of the optical fibers 100 to assist in securing the optical fibers within the base 15.

The fiber retention cover 16 may be formed of any desired material. In one example, the fiber retention cover 16 may be formed of a relatively rigid material such as glass or ceramic. In another example, the fiber retention cover 16 may be formed of a polymer or resin. In some embodiments, the fiber retention cover 16 may be formed of a material that is transparent to ultraviolet light so that an ultraviolet curable epoxy may be used to secure the optical fibers 100 and the cover.

Figure 4:
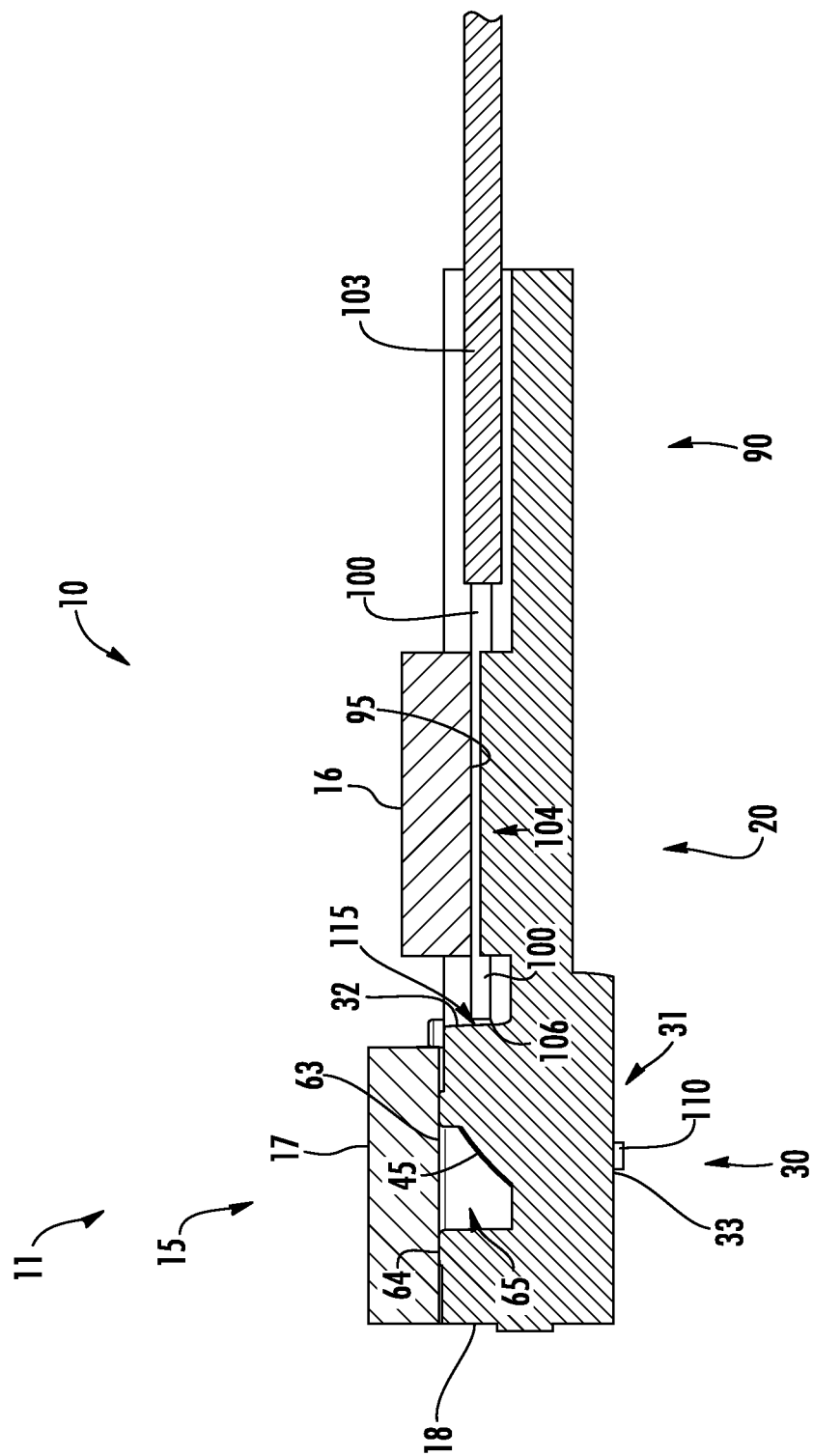
FIG. 4 is a side view of FIG. 3.
Figure 5:
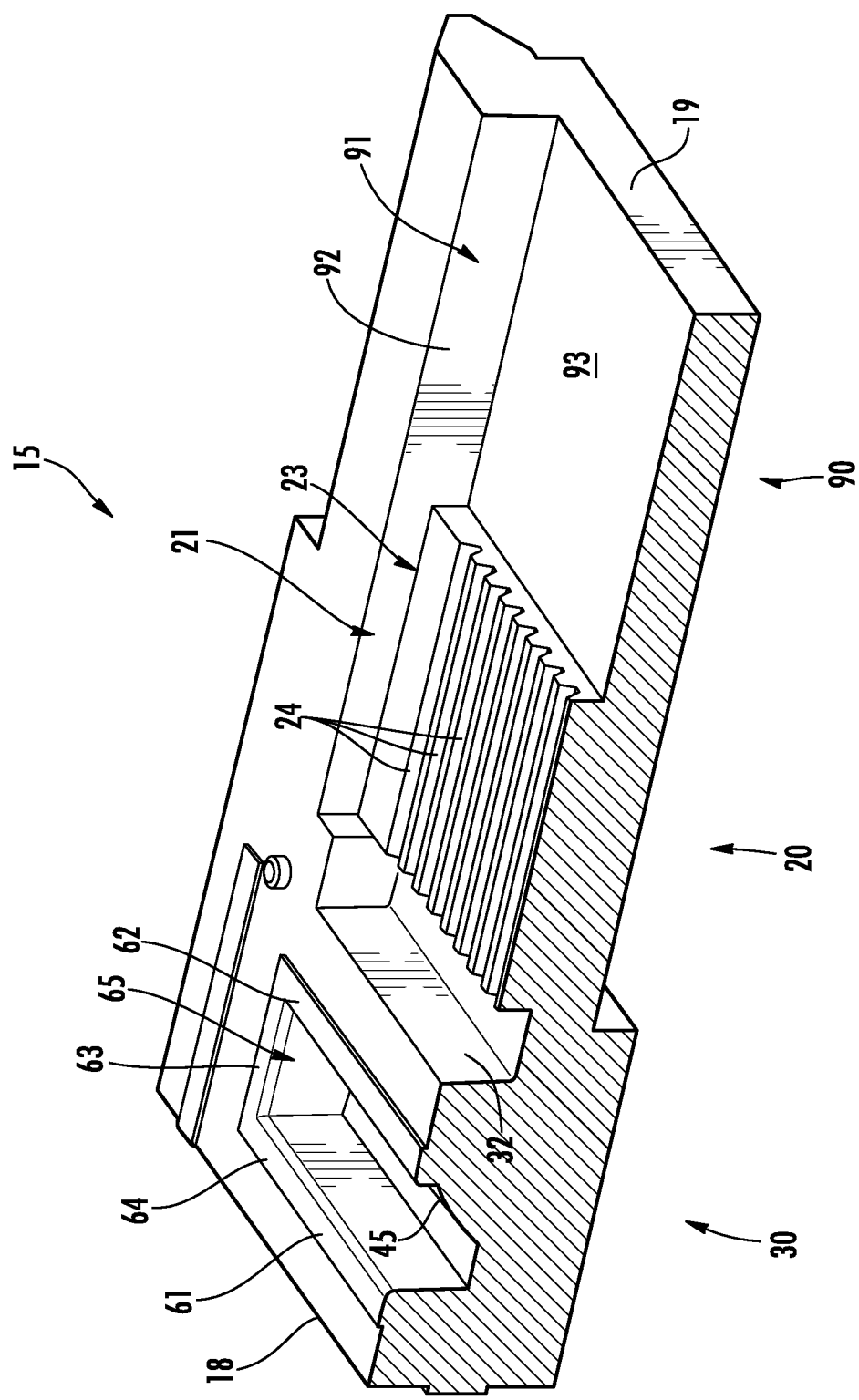
FIG. 5 is a sectional view similar to FIG. 3 but only depicting the base and taken from a different perspective.

Reflector cover 17 is generally rectangular and is dimensioned to be at least partially positioned over the optical coupling block 31. As depicted in FIGS. 1 and 4, the reflector cover 17 is positioned on and secured to the surface 64 of support member 60 associated with the optical coupling block 31. In doing so, an adhesive such as epoxy may be applied around the entire surface 64 to secure the reflector cover 17 to the support member 60 and thus secure the cover in place. In another example, the adhesive may be applied only along the longitudinal rails 63. In other words, the reflector cover may only be secured along the side edges of the support member 60.

The reflector cover 17 may be operative to limit the thermal expansion of the optical coupling block 31. The polymer optical coupling section 30, and thus the optical coupling block 31, may expand and contract relatively significantly with changes in temperature. As discussed above, the design of each optical coupling element 40 will compensate along the optical paths for changes due to thermal expansion. However, lateral or transverse expansion and contraction of the optical coupling block 31 (i.e., perpendicular to the longitudinal axis 35 of base 15) will not affect each optical coupling element 40 uniformly.

More specifically, the optical coupling elements 40 near the centerline of the optical coupling block 31 may experience very little transverse movement relative to a centerline of the coupling block while the optical coupling elements near the outer edges of the coupling block may experience substantially more transverse expansion or movement. In instances in which some of the components of the optical system 10 expand differently as compared to other components (e.g., the optical coupling block 31 as compared to the opto-electronic components 110 or a substrate (not shown) upon which the optical components are mounted), the reflector cover 17 may assist in maintaining the desired lateral positioning between components.

The reflector cover 17 may be formed of any relatively rigid material having a coefficient of thermal expansion less than that of the base 15. In one example, the reflector cover 17 may be formed of a relatively rigid material such as glass or ceramic. In some embodiments, the reflector cover 17 may be formed of a material that is transparent to ultraviolet light so that an ultraviolet curable epoxy may be used to secure the cover to the base 15. If desired, one or more additional or alternate expansion restricting components formed of a material having a coefficient of thermal expansion less than that of the base 15 may be secured to the base (such as along the first edge 18) to restrict thermal expansion of the base.

In some embodiments (e.g., optical coupling blocks 31 having eight or fewer optical coupling elements 40), the transverse expansion may not be significant enough to necessitate the use of a reflector cover 17. In other embodiments, a reflector cover 17 may be desirable to limit the thermal expansion of optical coupling section 30 and thus the expansion and contraction of the optical coupling block 31 regardless of the number of optical coupling elements.

Regardless of the number of optical coupling elements 40 in some instances, a reflector cover 17 may be used to seal the area surrounding the recess 65 within the support member 60 that defines the reflecting surfaces 41 of the optical coupling elements. In such case, reflector cover 17 is operative to reduce the likelihood that any contaminants will contact the reflecting surface 31 and thus may eliminate the need for reflective coating 67.

Although depicted as two separate components, in some embodiments, the fiber retention cover 16 and the reflector cover 17 may be combined as a single component. Further, in instances in which reflector cover 17 is configured to limit lateral or transverse thermal expansion of optical coupling block 31, it may also be desirable to configure fiber retention cover 16 to limit lateral or transverse thermal expansion of the recess 21 of fiber retention and alignment section 20.

To optically interconnect a plurality of first optical components such as optical fibers 100 to a plurality of second optical components such as opto-electronic components 110 through optical assembly 11, the optical fibers are prepared by stripping or removing the buffer 103 and any other material surrounding the fibers from a predetermined length of each optical fiber. The optical fibers 100 may be cut or cleaved to the desired length in any manner to create free ends 106.

An adhesive such as an optical index matched ultra-violet curable epoxy may be applied to the V-grooves 24. The optical fibers 100 are aligned with and inserted into the V-grooves 24 then slid towards the first optical face 32 so that the free ends 106 of the optical fibers 100 are positioned a desired distance from the first optical face to define a first gap 115. Additional adhesive may be applied within recess 21 such as on top of the optical fibers 100 and/or along the lower surface 95 of fiber retention cover 16 and the cover positioned over the V-grooves 24. The adhesive is then cured to secure the fiber retention cover 16 and the optical fibers 100 to the base 15.

To optically interconnect the second optical components such as opto-electronic components 110, the second optical components are aligned along and secured to the second optical face 33. More specifically, each of the second optical components is aligned with a second focal point 56 and then secured with an adhesive such as an epoxy. The second optical components may be actively or passively aligned at each second focal point 56. To actively align the second optical components, a source is provided and output measured through each pair of first and second optical components as is known in the art and the second optical component is then fixed at the location providing the highest, or a sufficiently high, output. Active alignment may be desirable when used with components that require a relatively high degree of precision of alignment (i.e., have small alignment tolerances) such as single-mode opto-electronic components and fibers.

Passive alignment of the second optical components may be accomplished in any desired manner. In one example, a plurality of pockets 34 (FIG. 13) may be formed within the second optical face 33 so that the second focal points 56 are recessed from the second optical face. By controlling the tolerances of the pockets 34, alignment within a desired level of precision may be achieved. Passive alignment may be desirable when used with components that require a lesser degree of precision of alignment (i.e., have relatively large alignment tolerances) such as multi-mode opto-electronic components and fibers or detectors that have a relatively large detection zone.

Other methods of component alignment may be used. In another example, it may be possible to utilize a combination of alignment methods such as by using active alignment for one or more components and passive alignment of other components based upon the position of the actively aligned component(s). In still another example, the optical components may be mounted on a substrate (not shown) and only one or two of the optical components actively aligned.

If a reflector cover 17 is being used, an adhesive such as epoxy may be applied to either or both of the base 15 and the reflector cover and the reflector cover positioned on the base at the support member 60. The adhesive is then cured to secure the reflector cover 17 to the base 15. The reflector cover 17 may be secured to the base 15 at any time, such a prior to or after securing the optical fibers 100 to the base.

The use of the pockets 34 in which opto-electronic components 110 are positioned may also permit the optical components such as photo diodes and lasers to be sealed within the pockets. In the alternative, a larger recess or cavity, or another component, may be used to receive all of the opto-electronic components and all of the components sealed together.

During assembly of the optical system 10, an index-matched medium 68 may be used to fill the first gap 115 (FIGS. 4, 7) between each first optical component such as optical fibers 100 and the first focal surface 50 of its coupling element 40 and a second gap 116 between each second optical component such as the opto-electronic components 110 and the second focal surface 55 of the optical element. It should be noted that FIGS. 4, 7 are not to scale for purposes of illustration. The gaps 115, 116 may be any desired distance. In one example, the gaps 115, 116 may be between 25 and 50 microns. In another example, the gaps 115, 116 may be between approximately 30 and 150 μm. In still another example, the gaps 115, 116 may be between approximately 50 and 150 μm. In a further example, the gaps 115, 116 may be between approximately 60 and 100 μm. In still a further example, the gaps 115, 116 may be between approximately 50 and 1000 μm. In a further example, the gaps 115, 116 may be approximately 80 μm. In still other examples, the gaps 115, 116 may be eliminated. In some applications, the gap 115 may not be identical to the gap 116.

The refractive index of the medium 68 may closely match the refractive indices of the first optical component, the second optical component, and the coupling block 31. The medium 68 may be an index matched adhesive such as an epoxy that not only transfers light between the first optical component, the second optical component, and the coupling block 31 in an efficient manner but also functions to secure the first optical component and the second optical component to the coupling block. The epoxy between the optical fibers 100 and the first optical face 32 may be applied and cured at the same time the optical fibers are secured within the V-grooves 24.

In an alternate embodiment, the first optical component and the second optical component may be secured to the coupling block 31 using some structure or mechanism other than an adhesive and the medium 68 may be an index matching gel, fluid or other material that does not have adhesive qualities.

The index of refraction of the medium 68 may be any desired value. In one example, the index of refraction of a silica optical fiber is approximately 1.48 and the index of refraction of the polymer coupling block 31 is approximately 1.56. In such case, the index of refraction of the medium 68 may be matched to approximate the midpoint (i.e., approximately 1.52) between the indices of refraction of the optical fibers 100 and the coupling block 31. In another example, the index of refraction of the medium 68 may be set to be approximately equal to the index of refraction of either the optical fibers 100 or the coupling block 31. In still another example, the index of refraction of the medium 68 may be set at any value between the indices of refraction of the optical fibers 100 and the coupling block 31. Regardless of the medium, the use of an index matched medium will generally result in improved optical characteristics within the optical system 10.

The coupling elements 40 of coupling block 31 provide the advantage of redirecting and focusing optical signals from the first optical component to respective ones of the second optical components without transmitting the signals through air and thus reduce the impact of reflections and changes in temperature on the signal transmission. More specifically, as a signal travel through the coupling element 40 (i.e., from the first foci 51 to the reflecting surface 41 and from the reflecting surface to the second foci 56), it is subject to a constant index of refraction along its entire path since it is always traveling though the polymer material of the coupling block 31.

Still further, the components other than the coupling element 40 that form each optical path of optical system 10 (i.e., first optical component, second optical component, and medium 68) have very similar indices of refraction and thus changes in temperature have a relatively small impact. By closely matching the indices of refraction of the first optical component, the second optical component, the coupling element 40, and the medium 68 and avoiding the transmission of the signal through air, the impact of changes in the index of refraction due to changes in temperature and resulting degradation in the optical signal may be minimized.

By reducing the impact of temperature change with respect to the refractive index, the beam of light or optical signal is consistently focused on the target location. While this may be desirable in most applications, it may be especially important when one or both of the first and second optical components are single mode optical components due to the relatively small tolerances as compared to those of multi-mode components.

The shape of each coupling element 40 may also provide the benefit of compensating to some extent for changes in the physical structure of the coupling element due to expansion and contraction with changes in temperature. More specifically, due to the ellipsoidal shape of the reflecting surface 41, the position of the first focal point 51 and the second focal point 56 will typically follow the position of the first optical component and the second optical component, respectively, as the coupling element 40 changes size with changes in temperature.

The configuration of optical assembly 11 also permits a reduction in the number of overall components, which may reduce the cost and complexity of the assembly process. More specifically, the use of coupling element 40 that is directly engaged by the first and second optical components (through the index-matching medium 68) results in a reduction of the number of components along the optical path. The reduction in the number of components along the optical path reduces the number of interfaces between components and thus reduces the locations or opportunities for reflection of optical signals. In addition, the reduction in the number of components also reduces the number of components that must be aligned. Reductions in the number of active alignment processes may result in faster and less costly assembly of the optical system 10. In addition, reductions in the number of components that must be aligned also increases the likelihood that passive alignment of components may be utilized.

The reduced number of components may also eliminate the transmission of optical signals through air. Eliminating optical transmission through air may provide a number of further advantages. First, the elimination of the air space required for the air transmission may permit a reduction in the size of the optical assembly 11. In addition, the elimination of optical transmission through air may eliminate or reduce the need for anti-reflective coatings and hermetic sealing. In some applications, anti-reflective coating may decrease the optical performance of the system in addition to increasing the cost. The elimination of hermetic sealing may also reduce the size and complexity of the assembly as well as simplify the assembly process and improve the robustness of the assembly.

It will be appreciated that the foregoing description provides examples of the disclosed system and technique. However, it is contemplated that other implementations of the disclosure may differ in detail from the foregoing examples. For example, although the embodiments are depicted with a plurality of optical fibers and other optical components, the concepts described herein are applicable to embodiments including only a single optical fiber or optical component at each face of the optical coupling member. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. An optical system comprising:
a base having a fiber retention and alignment section and an optical coupling section, the fiber retention and alignment section having a plurality of alignment members, each alignment member being configured to receive an optical fiber therein, the optical coupling section having an optical coupling block formed of a polymer material and including a plurality of optical coupling elements, each optical coupling element having an ellipsoidal reflecting surface defining a first focal point and a second focal point, a first focal surface being generally aligned with the first focal point, a second focal surface being generally aligned with the second focal point, the first focal surface and the second focal surface being spaced apart and at an angle to each other, and an optical path extending through each optical coupling element from the first focal point to the reflecting surface and to the second focal point, each alignment member being aligned with the first focal point of one of the optical coupling elements;
a plurality of optical fibers, each optical fiber being positioned within one of the alignment members and adjacent one of the first focal surfaces;
a plurality of optical components, each optical component being positioned adjacent one of the second focal surfaces; and
wherein the polymer of the optical coupling block has a first coefficient of thermal expansion, and further including an expansion restricting component secured to the optical coupling section, the expansion restricting component being formed of material having a second coefficient of thermal expansion, the first coefficient of thermal expansion being greater than the second coefficient of thermal expansion.

2. The optical system of claim 1, wherein the base is a one-piece, unitarily formed member.

3. The optical system of claim 1, wherein each optical path is entirely through the polymer material.

4. The optical system of claim 1, wherein the optical coupling block has lateral sides and the expansion restricting component is secured to the optical coupling section generally adjacent the lateral sides.

5. The optical system of claim 1, wherein the optical coupling block further includes a support member extending generally around a portion of the optical coupling block and the expansion restricting component is secured to the support member along lateral sides thereof.

6. The optical system of claim 1, wherein the optical coupling section includes a surface with a recess therein, the recess defining at least a portion of each of the reflecting surfaces.

7. The optical system of claim 6, further including a reflector cover secured to the optical coupling section to seal the recess.

8. The optical system of claim 7, wherein the optical coupling block is formed of a polymer material, the polymer material having a first coefficient of thermal expansion, and the reflector cover is formed of material having a second coefficient of thermal expansion, the first coefficient of thermal expansion being greater than the second coefficient of thermal expansion.

9. The optical system of claim 1, wherein each alignment member is a V-groove.

10. The optical system of claim 1, wherein each optical component is an opto-electronic component.

11. The optical system of claim 1, wherein a first external optical path between each optical fiber through a first coupling medium and into the optical coupling block and a second external optical path between each optical component through a second coupling medium and into the optical coupling block do not pass through air.

12. The optical system of claim 1, wherein the angle of the first focal surface relative to the second focal surface is between approximately 70 and 110 degrees.

13. The optical system of claim 1, wherein a first gap exists between the optical fiber and the first focal surface, a second gap exists between the optical component and the second focal surface, and an index matched medium is positioned within each gap.

14. The optical system of claim 1, wherein an outer surface of the base adjacent the reflecting surface has a reflective coating thereon.

15. The optical system of claim 14, wherein the reflective coating is chosen from one of gold, silver, and a gold alloy.

16. An optical system comprising:
a base having a fiber retention and alignment section and an optical coupling section, the fiber retention and alignment section having at least one alignment member for receiving an optical fiber therein, the optical coupling section having an optical coupling block formed of a polymer material and including at least one optical coupling element, each optical coupling element having an ellipsoidal reflecting surface defining a first focal point and a second focal point, a first focal surface being generally aligned with the first focal point, a second focal surface being generally aligned with the second focal point, the first focal surface and the second focal surface being spaced apart and at an angle to each other, and an optical path extending through each optical coupling element from the first focal point to the reflecting surface and to the second focal point, each alignment member being aligned with the first focal point of one of the optical coupling elements;
at least one optical fiber, each optical fiber being positioned within one of the alignment members and adjacent one of the first focal surfaces;
at least one optical component, each optical component being positioned adjacent one of the second focal surfaces; and
wherein the polymer of the optical coupling block has a first coefficient of thermal expansion, and further including an expansion restricting component secured to the optical coupling section, the expansion restricting component being formed of material having a second coefficient of thermal expansion, the first coefficient of thermal expansion being greater than the second coefficient of thermal expansion.

17. The optical system of claim 16, wherein the base is a one-piece, unitarily formed member.

18. An optical assembly comprising:
a one-piece, unitarily formed base having a fiber retention and alignment section and an optical coupling section, the fiber retention and alignment section having a plurality of alignment members, each alignment member being configured to receive an optical fiber therein, the optical coupling section having an optical coupling block formed of a polymer material and including a plurality of optical coupling elements, each optical coupling element having an ellipsoidal reflecting surface defining a first focal point and a second focal point, a first focal surface being generally aligned with the first focal point, a second focal surface being generally aligned with the second focal point, the first focal surface and the second focal surface being spaced apart and at an angle to each other, and an optical path extending through each optical coupling element from the first focal point to the reflecting surface and to the second focal point, each alignment member being aligned with the first focal point of one of the optical coupling elements; and wherein the polymer of the optical coupling block has a first coefficient of thermal expansion, and further including an expansion restricting component secured to the optical coupling section, the expansion restricting component being formed of material having a second coefficient of thermal expansion, the first coefficient of thermal expansion being greater than the second coefficient of thermal expansion.

* * * * *